Oct. 4, 1955 L. H. REAGAN 2,719,883

NIGHT TURRET TRUNK

Filed March 31, 1953 4 Sheets-Sheet 1

INVENTOR.
LEON H. REAGAN
BY Francis E. Blake
ATTORNEY

NIGHT TURRET TRUNK

Filed March 31, 1953 4 Sheets-Sheet 2

INVENTOR.
LEON H. REAGAN
BY [signature]
ATTORNEY

Oct. 4, 1955 L. H. REAGAN 2,719,883

NIGHT TURRET TRUNK

Filed March 31, 1953 4 Sheets-Sheet 3

INVENTOR.
LEON H. REAGAN
BY Francis Z. Blake
ATTORNEY

Oct. 4, 1955 L. H. REAGAN 2,719,883

NIGHT TURRET TRUNK

Filed March 31, 1953 4 Sheets-Sheet 4

INVENTOR.
LEON H. REAGAN

BY Francis E. Blake
ATTORNEY

United States Patent Office 2,719,883

Patented Oct. 4, 1955

2,719,883

NIGHT TURRET TRUNK

Leon H. Reagan, Richland, Wash., assignor to Stromberg-Carlson Company, a corporation of New York Application March 31, 1953, Serial No. 345,849

11 Claims. (Cl. 179—42)

Figure 1:
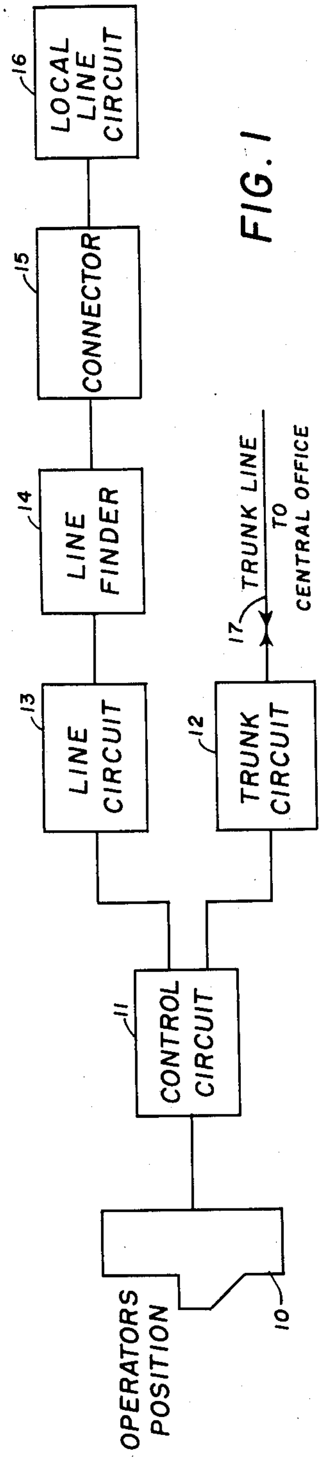

The present invention relates to telephone systems and more particularly to an improved supervisory and control circuit for facilitaing the routing of calls from one line to another through an operator's position.

Telephone systems arranged to provide for trunk lines from a central office, local lines of a private branch exchange, and an operator's position for routing calls between the trunk lines and the local lines are well known. In such systems, means must be provided for closing a loop circuit to the trunk line, or to the local line, or both, and to interconnect the local and trunk lines when required. It is also desirable to provide supervisory signal means to indicate at the operator's position when a call routed from a trunk line to a local line is answered, and to indicate hang up by either the local line or trunk line after a call from the trunk line to the local line has been answered.

It is therefore an object of the present invention to provide a simplified form of control and supervisory circuit for an operator's position to control the routing of calls from a trunk line to a local line and supervise the completion of such calls.

Another object of the invention is to provide a simplified control circuit for telephone systems of the type mentioned, the control circuit having a single relay arranged to close a loop across either a trunk line or a local line or both simultaneously for holding such lines.

Yet another object of the invention is to provide a simplified supervision and control circuit of the type mentioned in the foregoing objects and in which the same relay used for closing the loop to either the trunk line, local line or both is operated to give a supervision signal indicating the seizure or holding of such lines and is restored only when the call to the local line is answered while both the trunk line and the local line are held to thus give a supervisory signal indicating the answering of the call.

In practicing the invention, a single supervision and control relay is provided at the operator's position and is arranged to be connected to close a loop across an incoming trunk line or an outgoing local line or both simultaneously and to be operated by the battery feed relays associated with the trunk and local lines. With such an arrangement, the associated battery feed relays of the trunk and local lines are normally connected with the same polarities, but when a call is answered over the local line, the polarities of the connections of the battery feed relay to the local line are reversed. So long as the polarities of the connections of the battery feed relays for both the trunk line and the local line are the same, the supervisory relay connected across both lines will be operated. However, when the connections of the battery feed relay for the local line are reversed for answer supervision, the potentials supplied by both battery feed relays of the trunk and local lines will oppose each other and the supervisory relay connected across both lines will be restored to indicate answering of the call. Thereafter, should the calling party hang up, the supervisory relay will be reoperated so long as the associated battery feed relay of the called line is still connected, or in the case of hang up by the party on the local line, the called battery feed relay is re-reversed and the polarities of both battery feed relays again become the same.

Figure 6:
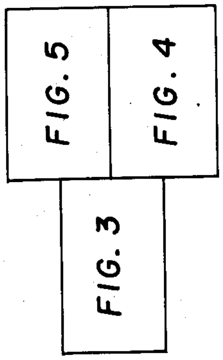
Figure 2:
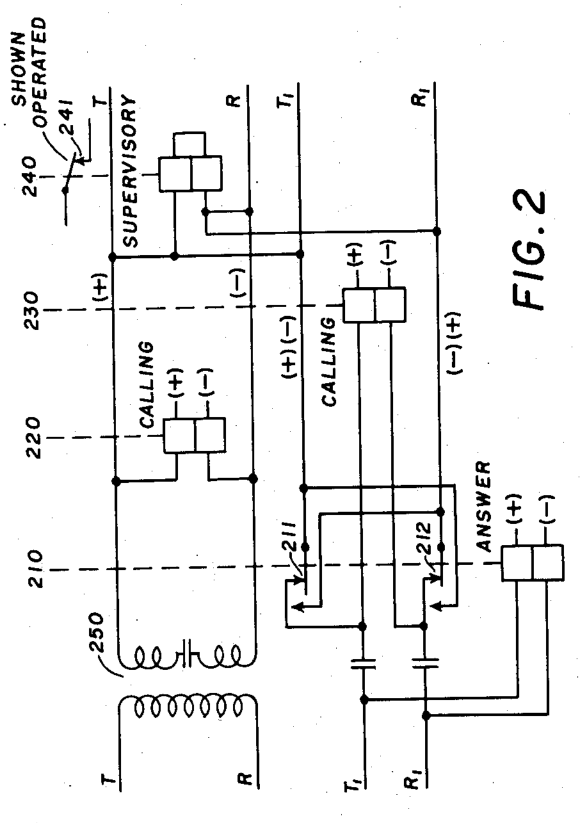
Figure 3:
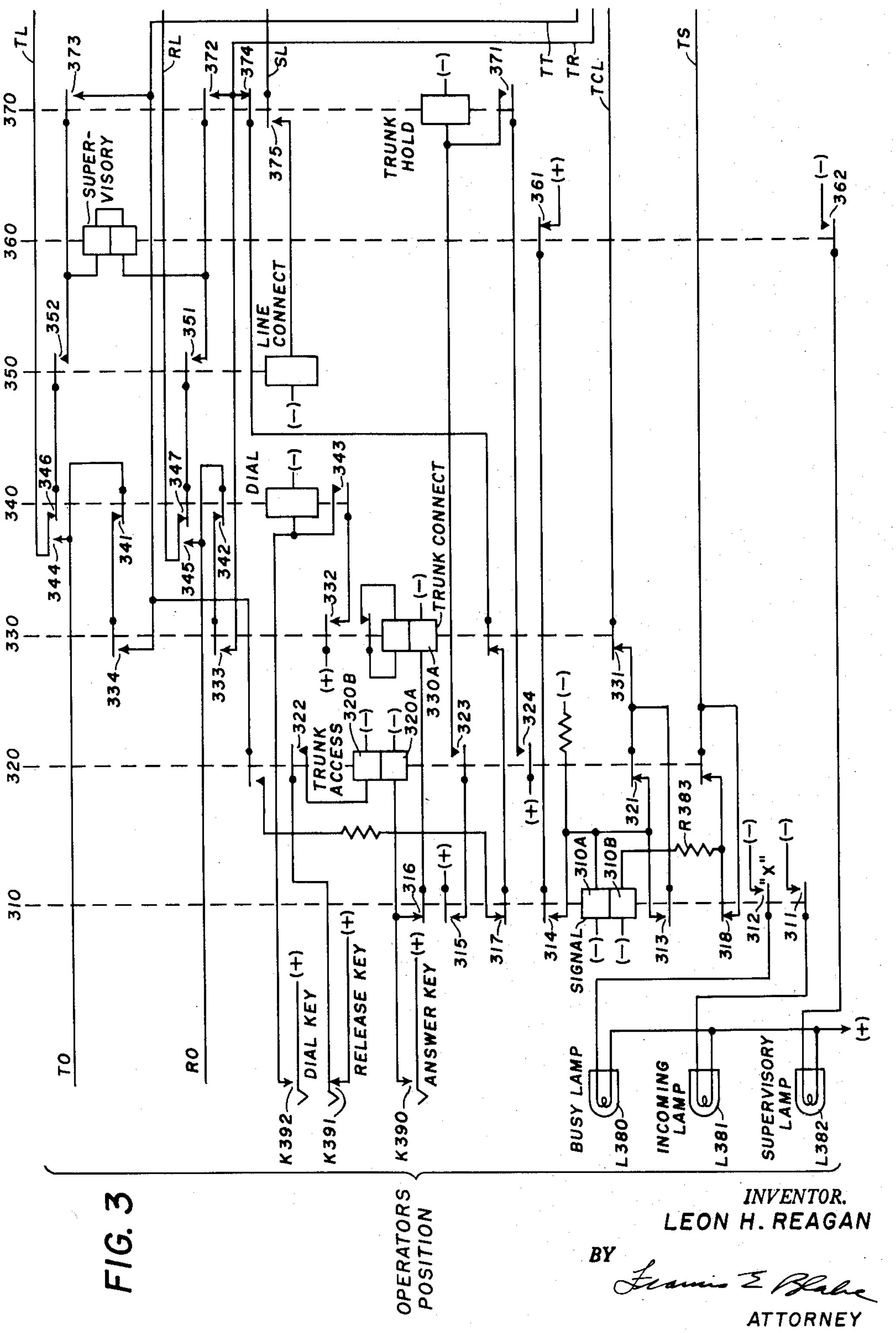
Figure 4:
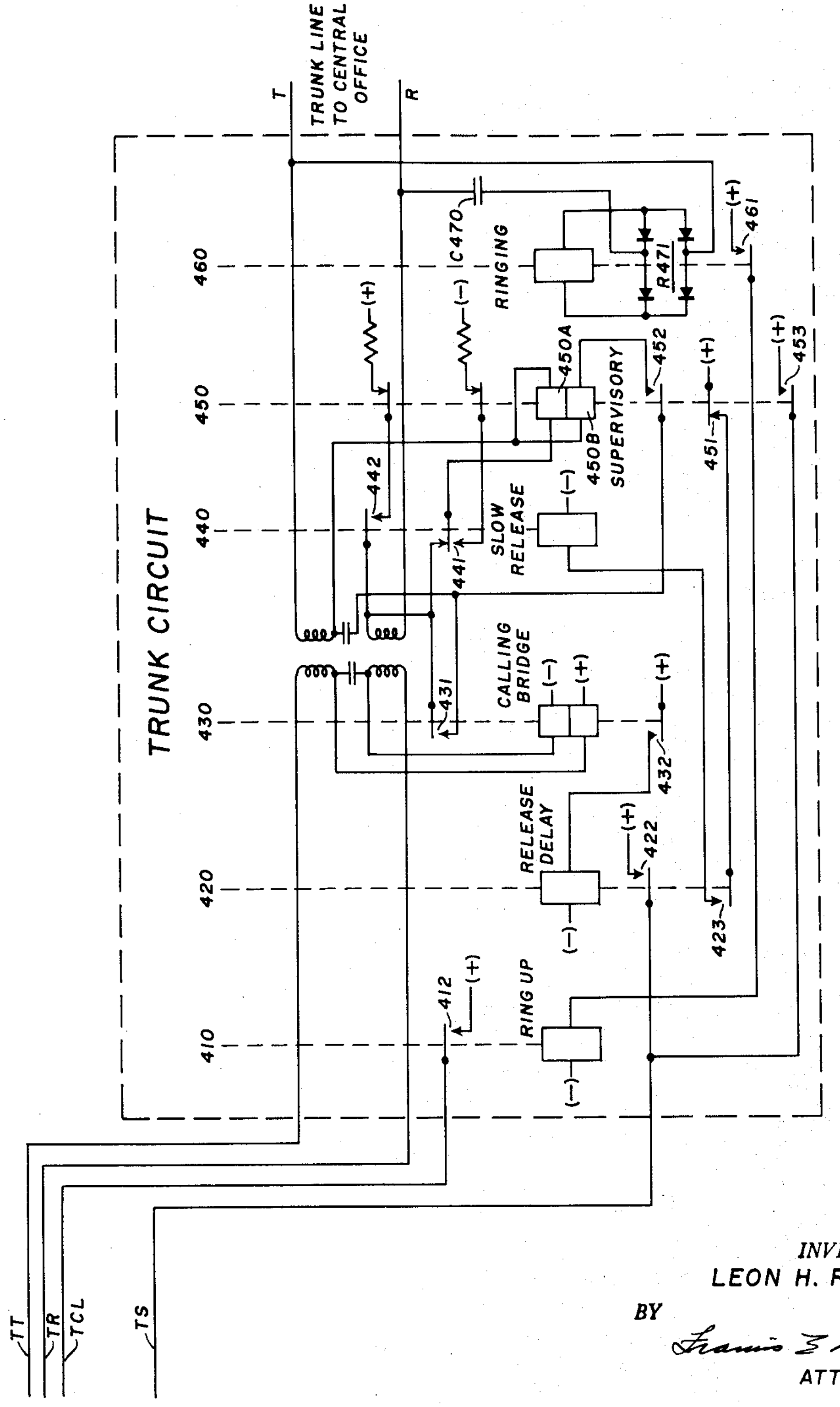
Figure 5:
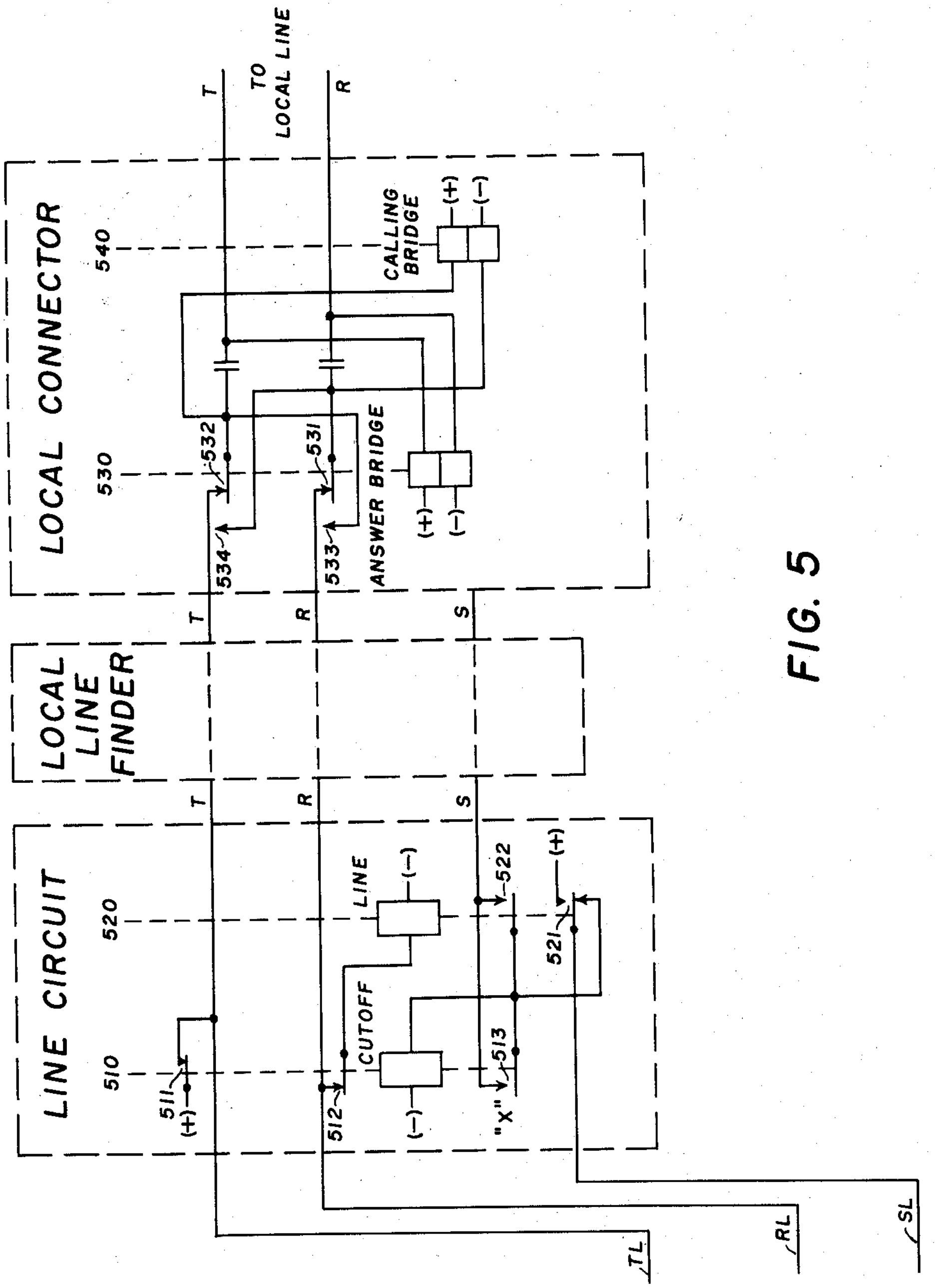

Further objects, features and the attending advantages of the invention will be apparent with reference to the following specifications and drawings in which:

Fig. 1 is a block diagram of a typical telephone system to which the invention applies, Fig. 2 is a schematic of a simplified arrangement to show the principles of the invention, Fig. 3 is a schematic of an operator's position circuit embodying the supervisory and control circuit and relay of the invention, Fig. 4 is a partial schematic of a simplified trunk circuit for connecting a trunk line from a central office to the position circuit of Fig. 3, Fig. 5 shows only the essential circuit details of a local line circuit, linefinder and connector as used with the position circuit of Fig. 3, and Fig. 6 is a block diagram to show the manner of interconnecting Figs. 3–5.

An example of a typical telephone system to which the invention may be applied is shown by block diagram of Fig. 1. An operator's position or night attendant's cabinet 10 is provided with a control circuit 11 for routing connections from the trunk circuit 12 to the line circuit 13. There may be one or more trunk circuits similar to the trunk circuit 12 for connection to an associated trunk line such as the trunk line 17 extending to a central office or the like (not shown). Similarly, there may be one or more line circuits similar to the line circuit 13 which is associated with a linefinder 14 and connector 15 of a private automatic branch exchange or the like. In the system described, calls from the central office over the trunk line 17 are routed through the control circuit 11 to the operator's position where the call may then be extended through the same control circuit 11 to the line circuit 13 of the automatic exchange and eventually to the desired local line such as the local line 16. As mentioned before, the present invention is concerned broadly with improvements in the control circuit 11 and more particularly with an improved combined holding and supervisory relay which may function to maintain a closed loop across either the trunk circuit 12 or the line circuit 13, or both, and which may be further operated to provide supervisory signaling to the operator's position in a manner to indicate answering of the call by the party on the local line circuit 16 or hang up by either party.

Fig. 2 of the drawings shows a simplified schematic of the circuit for connecting the combined supervisory and control relay 240 to tip and ring conductors T and R of a trunk circuit, representing the trunk circuit 12 of Fig. 1, and to the tip and ring conductors T1 and R1 of a line circuit, representing the line circuit 13 of Fig. 1. A battery feed or calling bridge relay 220 is shown to be connected to the tip and ring conductors T and R of the trunk circuit at the repeat coil 250 while a similar battery feed or calling bridge relay 230 is connected through reversing contacts 211 and 212 of the answer bridge relay 210 to the tip and ring conductors T1 and R1 of the called line. For purposes of simplicity in the present description, the combined control and supervisory relay 240 is shown to be permanently connected across both tip and ring conductors T and R and tip and ring conductors T' and R' in parallel although it should be understood that suitable relay switch circuits are to be provided to determine the connections of the relay 240 to the respective tip and ring conductors as will be described in more detail in connection with Figs. 3–5 of the drawings. The battery feed relay 220 and the battery feed relay 230 are both normally connected to the respective tip and ring conductors T, R and T', R' with the same polarity such that the positive or grounded polarity is connected to the tip conductor while the negative or battery polarity is connected to the ring conductor. With such connections the supervisory relay 240 is operated by the batteries of both battery feed relays to close its contacts 241 and appropriately initiate the desired signaling. It will also be noted that both of the battery feed or calling bridge relays 220 and 230 are operated by the closed loop circuit provided by the coils of the supervisory and control relay 240 so that the holding of the respective lines by the operation of their respective battery feed relays is obtained.

Assuming now that a call has been extended from the conductors T and R to the conductors T' and R' with the respective battery feed relays 220 and 230 operated together with the control supervisory relay 240 as mentioned above, when the call is answered, the answer bridge relay 210 is conventionally operated which operates the reversing contacts 211 and 212 to reverse the polarity of the connections of the battery feed or calling bridge relay 230 to the tip and ring conductors T' and R'. The polarities of the potentials supplied by the battery feed relays 220 and 230 are now opposing each other and therefore the supervisory and control relay 240 is restored since there is no appreciable potential difference across the conductors T, R and T', R' in parallel. It is, of course, understood that the comparative impedances of the windings of the relays 220 and 230, together with the length of line and resistance involved, should be approximately the same if the voltage across the combined control and supervisory relay 240 is to be zero. However, for all practical purposes, the voltage across the relay 240 is insufficient to maintain the operation of such relay when the polarities of connections for the calling bridge relay 230 are reversed with respect to the polarities of the connections of calling bridge relay 220 to their respective tip and ring conductors. The restoration of the supervisory relay 240 opens the signaling circuit at contacts 241 to thereby indicate answering of the call and the operation of the answer bridge relay 210 and it will be noted that the coil of the supervisory relay 240 is still connected across the tip and ring conductors T, R, and T', R', to maintain the holding loop even though the supervisory relay is now restored.

Reference is now made to Figs. 3–5 of the drawings for a more detailed description of the invention as applied to one typical telephone system. It should be understood that the trunk circuit of Fig. 4 has been simplified and that any other suitable form of trunk circuit may be used. Fig. 5 of the drawings discloses certain of the circuit details of a line circuit and a local connector interconnected through a linefinder, the linefinder being shown only in block outline. Again the circuit details of both the line circuit and the local connector have been simplified showing only those elements that are required for an understanding of the operation of control circuit of Fig. 3 wherein the operation of the combined supervisory and control relay 360 will be described in detail.

It is believed that the description of the circuits of Figs. 3–5 may be best understood by describing the routing of an incoming call from the central office through the trunk circuit of Fig. 4 to the control circuit and operator's position of Fig. 3 and thereafter to the line circuit, local linefinder and local connector of Fig. 5 to the called local line. When a call is received from a central office over the trunk line, the application of ringing voltage over the trunk line tip and ring conductors T and R causes the operation of the ringing relay 460 which is connected in the conventional manner through the condenser C470 and the full wave bridge rectifiers generally shown at R471. The operation of the ringing relay 460 connects ground through operated contacts 461 to energize the ring up relay 410. The operation of the ring up relay 410 closes contacts 412 to connect ground to the TCL lead extending to the control circuit of Fig. 3 and through normally closed contacts 331 and 321 to the coil 310A of the signal relay 310, thus operating such relay. The operation of the signal relay 310 closes contacts 311 and preliminary make contacts 312 to light the busy lamp L380 and the incoming lamp L381, thus signaling the attendant at the operator's position that an incoming call is to be received. The operation of relay 310 also closes contacts 313 to prepare a holding circuit for relay coil 310A independent of the normal contacts 321 and further closes contacts 314 to establish a holding circuit to ground for coil 310A through the normally closed contacts 361 of the supervisory and control relay 360. The operation of relay 310 also closes contacts 315 to prepare an operating circuit for the trunk holding relay 370 and opens contacts 316 to prevent the operation of the trunk connect relay 330 for the time being. The operation of signal relay 310 also opens contacts 317 and 318 which will be later referred to in detail.

Upon noting the illumination of the busy and incoming lamps, the operator closes the answer key K390 to thereby connect ground to the operating coil 320A of trunk access relay 320, thus operating such relay which thereby closes contacts 322 to provide a holding circuit through relay coil 320B from battery to the ground normally supplied through normally closed contacts of the release key K391. The operation of the trunk access relay 320 also closes contacts 323 to complete the operating circuit for the trunk holding relay 370 which thereupon operates and locks up through operated contacts 371 and 324 to ground independent of the operating circuit including the operated contacts 315 of the signal relay 310. The operation of the trunk holding relay 370 closes contacts 372 and 373 to connect the coils of the supervisory relay 360 across the tip and ring conductors TT and TR to the trunk circuit of Fig. 4. The operation of the trunk hold relay 370 also opens contacts 374 and closes contacts 375, to be referred to later in more detail.

With trunk hold relay 370 operated to connect the supervisory relay 360 across the tip and ring conductors TT and TR of Fig. 4, a loop circuit is closed to operate the battery feed or calling bridge relay 430 and the potential supplied through the calling bridge relay 430 from ground to tip conductor TT and through the supervisory relay 360 to ring conductor TR and battery, also causes the operation of the supervisory relay 360 to open contacts 361 and close contacts 362. The closing of contacts 362 energizes the supervisory lamp L382 to indicate the holding of the trunk circuit of Fig. 4 by the supervisory control relay 360. With supervisory relay contacts 361 open, the locking circuit for the signal relay 310 is broken although such relay may remain operated by the ground potential on the TCL conductor due to the operated condition of the ring up relay 410.

However, the aforementioned operation of the battery feed or calling bridge relay 430 closes contacts 431 to trip the ringing to the trunk line at the central office by connecting the low resistance coil 450B of the supervisory relay 450 across the trunk line conductors T and R through operated contacts 452. It should be mentioned that the supervisory relay 450 has been previously operated through its high resistance coil 450A from ground and battery on tip and ring conductors T and R supplied from the preceding connector battery feed (not shown). With relay 450 operated ground is connected through contacts 453 to the TS lead for obtaining the partial operation of relay 310 and the illumination of the busy lamp L380 as soon as the connector seizes the trunk circuit of Fig. 4. The operation of the calling bridge relay 430 also closes contacts 432 to connect ground to operate the release delay relay 420 which closes contacts 422 to connect an additional ground to the sleeve conductor TS extending to the control circuit of Fig. 3. The tripping of the ringing at the central office also restores ringing relay 460 which opens contacts 461 and the operating circuit for ring up relay 410 which thereupon restores to open contacts 412 and remove the operating ground on the TCL lead to the signal relay 310 of Fig. 3. With the ring up relay 410 restored, the signal relay 310 is only partially restored, since the ground on the sleeve conductor TS is then connected through normal contacts 318 and the resistor R383 to the coil 310B of signal relay 310 which thereby maintains the partial operation of relay 310 to maintain closed the preliminary make contacts 312 and thus maintain the energization of the busy lamp L380. All other contacts of the relay 310 are at this time restored to normal so that, among other functions, the incoming lamp L381 is extinguished.

With signal relay 310 now in the partially operated condition wherein only the preliminary make contacts 312 are operated, contacts 316 return to their normally closed condition, as shown, to complete a circuit for energizing trunk connect relay 330 through relay coil 330A from battery to ground on the operated answer key K390. The operation of relay 330 closes contacts 332 to prepare a locking circuit for the dial relay 340 and also closes contacts 333 and 334 to connect the operator's tip and ring leads TO and RO through normal contacts 341 and 342 to the trunk tip and ring conductors TT and TR of the trunk circuit of Fig. 4. Thus, a talking circuit is established between the operator and the calling party over the trunk circuit. When the operator learns that the call is to be extended to the local line through the automatic equipment, including the line circuit, local linefinder and local connector of Fig. 4, the dial key K392 is operated to connect ground to operate the dial relay 340 which thereupon locks up through operated contacts 343 to ground through operated contacts 332. With the dial relay 340 operated, the operator's talking leads TO and RO are connected through operated contacts 344 and 345 to the tip and ring conductors TL and RL of the line circuit of Fig. 4. With contacts 344 and 345 operated, ground through normal contacts 511 is connected through the operator's loop circuit to normal contacts 512 and line relay 520 to battery, thus operating such relay of the line circuit to close contacts 521 and connect ground to the SL lead and to the control circuit of Fig. 3. It will be recalled that the trunk hold relay 370 has been previously operated to establish the connections to the calling party through the trunk circuit of Fig. 4 and, therefore, contacts 375 are closed to connect the ground on the SL lead to operate the line connect relay 350 which closes contacts 351 and 352 to prepare a circuit connecting the supervisory relay 360 across the talking conductors TL and RL of the line circuit when the operator's loop circuit across TO and RO is disconnected. The operator then proceeds to dial the call in the usual manner seizing the local linefinder and local connector of Fig. 4 which returns ground on the sleeve conductor S of the line circuit, which ground is connected through contacts 522 to operate the cut-off relay 510 which is maintained operated by the circuit established through its preliminary make contacts 513. The operation of cut-off relay 510 opens contacts 511 and 512 to restore the line relay 520. With the line relay 520 restored, the ground on the sleeve conductor S is connected through preliminary make contacts 513 and normal contacts 521 to the SL conductor and the control circuit of Fig. 3 and thereby maintains the operation of the line connect relay 350 from the sleeve ground. After dialing the call, the operator may release both the dial key K392 and the answer key K390 to withdraw from the connection. At this time, however, the trunk access relay 320 remains operated through its holding circuit from ground on the release key K391 but the trunk connect relay 330 and the dial relay 340 are restored. With the relays 330 and 340 restored and the line connect relay 350 and the trunk hold relay 370 operated, the coil of the supervisory relay 360 is connected through operated contacts 351 and 352 and normal contacts 346 and 347 to the line circuit talking conductors TL and RL and also through the operated contacts 372 and 373 to the trunk circuit talking conductors TT and TR. In such manner, both the circuits of Fig. 4 and the circuits of Fig. 5 are held by the loop of the supervisory relay 360 while awaiting the answer of the call extended to the local line of Fig. 5. It has been assumed that the operator in dialing the call to the local line has completed the connection to the called line and that ringing voltage has been applied and only the answering of the call is awaited at the time that the operator withdraws from the connection. Under such circumstances, the calling bridge relay 540 of the local connector is connected through normal contacts 531 and 532 to the talking conductors of the local linefinder and line circuit and is operated by the loop circuit of the supervisory relay 360. It will be seen that ground polarity is applied to the tip conductor TL while battery polarity is applied to the ring conductor RL through the calling bridge or battery feed relay 540 and that such polarities of connections are the same as the polarity of connections for the battery feed or calling bridge relay 430 of the trunk circuit of Fig. 4. Thus, the supervisory relay 360 of the control circuit of Fig. 3 remains operated to maintain closed the contacts 362 and continue the illumination of the supervisory lamp L382. When the called party on the local line of Fig. 5 answers, the answer bridge relay 530 is operated, as is conventional, to open contacts 531 and 532 and close contacts 533 and 534 to reverse the polarity of connections of the calling bridge or battery feed relay 540. Thus, the polarities of the potential supplied by the calling bridge relay 540 to the talking conductors TL and RL are opposed to the polarities of the potential supplied by the calling bridge relay 430 to the trunk circuit talking conductors TT and TR, and since the supervisory relay 360 is connected across both talking conductors TL, RL, and TT, TR, the potential difference across the relay 360 becomes practically zero and such relay restores. The restoration of the supervisory relay 360 opens contacts 362 to extinguish the supervisory lamp L382 thus giving the operator a supervision signal that the call has been answered. It should now be emphasized that so long as both parties remain on the line the supervisory relay will not be operated, but should the called party on the local line of Fig. 5 hang up, the supervisory relay will then again become operated by the potentials supplied by the battery feed relays 430 and 540. Tracing this circuit in detail, when the called party on the local line of Fig. 5 hangs up, the answer bridge relay 530 will be restored to re-reverse the polarity connections of the calling bridge relay 540 thus reoperating the supervisory relay 360 to close contacts 362 and reenergize the supervisory lamp L382. The operator, upon noting the reillumination of the supervisory lamp L382, then momentarily operates the release key K391 to remove ground on the holding circuit winding 320B of trunk access relay 320 to restore such relay which opens contacts 323 and 324 to restore the trunk hold relay 370, opening contacts 372 and 373 to break the loop circuit established by the supervisory relay 360 across the trunk circuit conductors TT and TR. The restoration of trunk hold relay 370 also opens contacts 375 to restore the line connect relay 350 and break the loop circuit of the supervisory relay 360 across the line circuit conductors TL and RL. Thus, the calling bridge relay 430 of the trunk circuit of Fig. 4 and the release delay relay 430 of such circuit are restored and all remaining operated relays in the trunk circuit are thereafter restored in the conventional manner to release the trunk for further calls. The breaking of the loop circuit across the line circuit tip and ring conductors TL and RL by the opening of contacts 351 and 352 also restores the calling bridge relay 540 of the local connector which, through conventional circuits not shown in detail, eventually results in the removal of ground potential on the sleeve conductor S and the restoration of the cut-off relay 510. In such manner all of the circuits are returned to normal.

In the telephone system described above in connection with Figs. 3–5 of the drawings, a particular application of the combined supervisory and control relay 360 has been described in which a night service operator's position has been provided for routing incoming calls from a central office trunk line to local lines of a local private automatic branch exchange. In the particular system described there were no provisions for routing calls from the local line to the operator's position since it is not intended that such calls should be made under night service conditions. It should be obvious, however, that the principles of the invention wherein the same supervisory relay such as the supervisory relay 360 is used to maintain holding loop circuits on incoming and outgoing lines and also to provide answer supervision, may be applied to other types of telephone systems (not specifically described) in which calls may be extended from a local line of a private automatic branch exchange to an operator's position and then to an associated trunk line circuit and trunk line to a central office. In this connection, the basic principles of the invention are shown in Fig. 2 of the drawings and have already been previously discussed in detail.

Various modifications may be made within the spirit of the invention and the scope of the appended claims.

What I claim is:

1. A supervisory circuit for telephone systems having a first line and a second line together with means for routing calls from the first line to the second line, each of said first and second lines having battery feed relays connected thereto to be operated upon seizure of the respective line, said second line also having reversing means to reverse the connections of the associated battery feed relay upon answer of a call thereover, a supervisory relay, means to connect said supervisory relay across said first line to thereby operate the battery feed relay of said first line, means to also connect said supervisory relay across said second line when a call from said first line is routed to said second line to thereby operate the battery feed relay of said second line, said supervisory relay being operated by the potential supplied to either or both of the first or second line by the associated battery feed relay, the operation of said reversing means for the battery feed relay of said second line upon answer of a call thereover while said supervisory relay is connected across both said first and second lines being effective to cause the potential supplied by the battery feed relay of the second line to oppose the potential supplied by the battery feed relay of said first line to thereby restore the supervisory relay and thus indicate the answering of the call on the second line.

2. A supervisory circuit for telephone systems having a first line and a second line together with means for routing calls from the first line to the second line, each of said first and second lines having battery feed relays connected thereto to be operated upon seizure of the respective line, said second line also having reversing means to reverse the connections of the associated battery feed relay upon answer of a call thereover, a supervisory relay, means to connect said supervisory relay across said first line to thereby operate the battery feed relay of said first line, means to also connect said supervisory relay across said second line when a call from said first line is routed to said second line to thereby operate the battery feed relay of said second line, said supervisory relay being operated by both potentials supplied to said first and second lines by their associated battery feed relays, the operation of said reversing means for the battery feed relay of said second line upon answer of a call thereover while said supervisory relay is connetced across both said first and second lines being effective to cause the potential supplied by the battery feed relay of the second line to oppose the potential supplied by the battery feed relay of said first line to thereby restore the supervisory relay and thus indicate the answering of the call on the second line.

3. A supervisory circuit for telephone systems having at least first and second lines together with means for routing calls from the first line to the second line, each of said first and second lines having battery feed relays connected thereto to be operated upon seizure of the respective line, said second line also having reversing means to reverse the connections of the associated battery feed relay upon answer of a call thereover, a supervisory relay, means to connect said supervisory relay across said first line to thereby operate the battery feed relay of said first line, means to also connect said supervisory relay across said second line when a call from said first line is routed to said second line to thereby operate the battery feed relay of said second line, said supervisory relay being operated by the potential supplied to said first and second lines by their associated battery feed relays, the operation of said reversing means for the battery feed relay of said second line upon answer of a call thereover while said supervisory relay is connected across both said first and second lines being effective to cause the potential supplied by the battery feed relay of said second line to oppose the potential supplied by the battery feed relay of said first line to thereby restore the supervisory relay and thus indicate the answering of the call on the second line, said supervisory relay being reoperated upon restoration of said reversing means to indicate hang up by said second line while said first line is still connected thereto, the disconnection of said first line while said second line is still connected to said supervisory relay being also effective to reoperate said supervisory relay to indicate such disconnection.

4. A supervisory circuit for telephone systems having at least first and second lines together with means for routing calls by connecting the first line to the second line, each of said first and second lines having battery feed relays connected thereto to be operated upon seizure of the respective line, the polarities of connections of said battery feed relays to said first and second lines being normally the same, said second line also having reversing means to reverse the connections of the associated battery feed relay upon answer of a call thereover, a combined loop closing and supervisory relay, means to connect said supervisory relay across said first line to close a loop across said first line and operate the battery feed relay of said first line and said supervisory relay from the potential supplied by such battery feed relay, means to connect said first line to said second line and to thereby connect said supervisory relay across said second line when a call is routed to said second line to thus close a loop across said second line and operate the battery feed relay of said second line and said supervisory relay from the potential supplied to said second line by such battery feed relay, the operation of said reversing means for the battery feed relay of said second line upon answer of a call thereover while said supervisory relay is connected across both said first and second lines being effective to cause the potential supplied by the battery feed relay of said second line to oppose the potential supplied by the battery feed relay of said first line to thereby restore the supervisory relay and thus indicate the answering of the call on the second line, said supervisory relay being reoperated upon restoration of said reversing means to indicate hang up by said second line while said first line is still connected thereto, the disconnection of said first line while said second line is still connected to said supervisory relay being also effective to reoperate said supervisory relay to indicate such disconnection.

5. A supervisory circuit for telephone systems having at least first and second lines together with means for routing calls by connecting the first line to the second line, each of said first and second lines having battery feed relays connected thereto to be operated upon seizure of the respective line, the polarities of connections of said battery feed relays to said first and second lines being normally the same, said second line also having reversing means to reverse the connections of the associated battery feed relay upon answer of a call thereover, a combined loop closing and supervisory relay, means to connect said supervisory relay across said first line to close a loop across said first line and operate the battery feed relay of said first line and said supervisory relay from the potential supplied by such battery feed relay, means to connect said first line to said second line and to thereby connect said supervisory relay across said second line when a call is routed to said second line to thus close a loop across said second line and operate the battery feed relay of said second line and said supervisory relay from the potential supplied to said second line by such battery feed relay, the operation of said reversing means for the battery feed relay of said second line upon answer of a call thereover while said supervisory relay is connected across both said first and second lines being effective to cause the potential supplied by the battery feed relay of said second line to oppose the potential supplied by the battery feed relay of said first line to thereby restore the supervisory relay and thus indicate the answering of the call on the second line.

6. A supervisory circuit for telephone systems having at least first and second lines together with means for routing calls by connecting the first line to the second line, each of said first and second lines having battery feed relays connected thereto to be operated upon seizure of the respective line, the polarities of connections of said battery feed relays to said first and second lines being normally the same, said second line also having reversing means to reverse the connections of the associated battery feed relay upon answer of a call thereover, a combined loop closing and supervisory relay, means to connect said supervisory relay across said first line to close a loop across said first line and operate the battery feed relay of said first line and said supervisory relay from the potential supplied by such battery feed relay, means to connect said first line to said second line and to thereby connect said supervisory relay across said second line while maintaining the connection of said supervisory relay across said first line when a call is routed to said second line to thus close a loop across said second line and operate the battery feed relay of said second line, the operation of said reversing means for the battery feed relay of said second line upon answer of a call thereover while said supervisory relay is connected across both said first and second lines being effective to cause the potential supplied by the battery feed relay of said second line to oppose the potential supplied by the battery feed relay of said first line to thereby restore the supervisory relay and thus indicate the answering of the call on the second line.

7. A supervisory circuit for telephone systems having at least first and second lines together with means for routing calls by connecting the first line to the second line, each of said first and second lines having battery feed relays connected thereto to be operated upon seizure of the respective line, the polarities of connections of said battery feed relays to said first and second lines being normally the same, said second line also having reversing means to reverse the connections of the associated battery feed relay upon answer of a call thereover, a combined loop closing and supervisory relay, means to connect said supervisory relay across said first line to close a loop across said first line and operate the battery feed relay of said first line and said supervisory relay from the potential supplied by such battery feed relay, means to connect said first line to said second line and to thereby connect said supervisory relay across said second line while maintaining the connection of said supervisory relay across said first line when a call is routed to said second line to thus close a loop across said second line and operate the battery feed relay of said second line, the operation of said reversing means for the battery feed relay of said second line upon answer of a call thereover while said supervisory relay is connected across both said first and second lines being effective to cause the potential supplied by the battery feed relay of said second line to oppose the potential supplied by the battery feed relay of said first line to thereby restore the supervisory relay and thus indicate the answering of the call on the second line, said supervisory relay being reoperated upon restoration of said reversing means to indicate hang up by said second line while said first line is still connected thereto, the disconnection of said first line while said second line is still connected to said supervisory relay being also effective to reoperate said supervisory relay to indicate such disconnection.

8. A supervisory and control circuit for telephone systems having at least one incoming and one outgoing line to be interconnected through an operator's position, each of said incoming and outgoing lines having battery feed relays connected thereto to be operated upon seizure of the respective line, the polarities of connections of said battery feed relays to said incoming and outgoing lines being normally the same, said outgoing line also having reversing means to reverse the connection of the associated battery feed relay upon answer of a call thereover, a combined loop closing and supervisory relay, signal means to signal the operator of an incoming call from said incoming line, means operated at the operator's position to connect said supervisory relay to close a loop across said incoming line and operate the associated battery feed relay and said supervisory relay from the potential supplied by such battery feed relay, and means operated at the operator's position to connect said supervisory relay to close a loop across said outgoing line to thus operate the associated battery feed relay of the outgoing line, the operation of said reversing means for the battery feed relay of said outgoing line upon answer of a call thereover while said supervisory relay is connected across both said incoming and outgoing lines being effective to cause the potential supplied by the battery feed relay of said outgoing line to oppose the potential supplied by the battery feed relay of said incoming line to thereby restore the supervisory relay and thus indicate the answering of the call on the outgoing line.

9. A supervisory and control circuit for telephone systems having at least one incoming and one outgoing line to be interconnected through an operator's position, each of said incoming and outgoing lines having battery feed relays connected thereto to be operated upon seizure of the respective line, the polarities of connections of said battery feed relays to said incoming and outgoing lines being normally the same, said outgoing line also having reversing means to reverse the connections of the associated battery feed relay upon answer of a call thereover, a combined loop closing and supervisory relay, signal means to signal the operator of an incoming call from said incoming line, means operated at the operator's position to connect said supervisory relay to close a loop across said incoming line and operate the associated battery feed relay and said supervisory relay from the potential supplied by such battery feed relay, and means operated at the operator's position to connect said incoming line to said outgoing line and thereby connect said supervisory relay to close a loop across said outgoing line while maintaining the connection of said supervisory relay across said incoming line when a call from said incoming line is routed to said outgoing line to thus operate the associated battery feed relay of the outgoing line, the operation of said reversing means for the battery feed relay of said outgoing line upon answer of a call thereover while said supervisory relay is connected across both said incoming and outgoing lines being effective to cause the potential supplied by the battery feed relay of said outgoing line to oppose the potential supplied by the battery feed relay of said incoming line to thereby restore the supervisory relay and thus indicate the answering of the call on the outgoing line.

10. A supervisory and control circuit for telephone systems having at least one incoming and one outgoing line to be interconnected through an operator's position, each of said incoming and outgoing lines having battery feed relays connected thereto to be operated upon seizure of the respective line, the polarities of connections of said battery feed relays to said incoming and outgoing lines being normally the same, said outgoing line also having reversing means to reverse the connections of the associated battery feed relay upon answer of a call thereover, a combined loop closing and supervisory relay, signal means to signal the operator of an incoming call from said incoming line, means operated at the operator's position to connect said supervisory relay to close a loop across said incoming line and operate the associated battery feed relay and said supervisory relay from the potential supplied by such battery feed relay, and means operated at the operator's position to connect said incoming line to said outgoing line and thereby connect said supervisory relay to close a loop across said outgoing line to thus operate the associated battery feed relay of the outgoing line, the operation of said reversing means for the battery feed relay of said outgoing line upon answer of a call thereover while said supervisory relay is connected across both said incoming and outgoing lines being effective to cause the potential supplied by the battery feed relay of said outgoing line to oppose the potential supplied by the battery feed relay of said incoming line to thereby restore the supervisory relay and thus indicate the answering of the call on the outgoing line, said supervisory relay being reoperated upon restoration of said reversing means to indicate hang up by said outgoing line while said incoming line is still connected thereto, the disconnection of said incoming line while said outgoing line is still connected to said supervisory relay being also effective to reoperate said supervisory relay to indicate such disconnection.

11. A supervisory and control circuit for telephone systems having at least one incoming and one outgoing line to be interconnected through an operator's position, each of said incoming and outgoing lines having battery feed relays connected thereto to be operated upon seizure of the respective line, the polarities of connections of said battery feed relays to said incoming and outgoing lines being normally the same, said outgoing line also having reversing means to reverse the connections of the associated battery feed relay upon answer of a call thereover, a combined loop closing and supervisory relay, signal means to signal the operator of an incoming call from said incoming line, means operated at the operator's position to connect said supervisory relay to close a loop across said incoming line and operate the associated battery feed relay and said supervisory relay from the potential supplied by such battery feed relay, and means operated at the operator's position to connect said incoming line to said outgoing line to thereby connect said supervisory relay to close a loop acros said outgoing line while maintaining the connection of said supervisory relay across said incoming line when a call from said incoming line is routed to said outgoing line to thus operate the associated battery feed relay of the outgoing line, the operation of said reversing means for the battery feed relay of said outgoing line upon answer of a call thereover while said supervisory relay is connected across both said incoming and outgoing lines being effective to cause the potential supplied by the battery feed relay of said outgoing line to oppose the potential supplied by the battery feed relay of said incoming line to thereby restore the supervisory relay and thus indicate the answering of the call on the outgoing line, said supervisory relay being reoperated upon restoration of said reversing means to indicate hang up by said outgoing line while said incoming line is still connected thereto, the disconnection of said incoming line while said outgoing line is still connected to said supervisory relay being also effective to reoperate said supervisory relay to indicate such disconnection.

References Cited in the file of this patent

UNITED STATES PATENTS 2,395,155 Voss ------------------ Feb. 19, 1946